United States Patent [19]

Kim

[11] Patent Number: 5,839,682
[45] Date of Patent: Nov. 24, 1998

[54] FISHING REEL WITH REMOVABLE SIDE COVER ASSEMBLY

[75] Inventor: Hyunkyu Kim, Broken Arrow, Okla.

[73] Assignee: Zebco Corporation, Tulsa, Okla.

[21] Appl. No.: 679,506

[22] Filed: Jul. 12, 1996

[51] Int. Cl.[6] .............................................. A01K 89/015
[52] U.S. Cl. ........................................................ 242/314
[58] Field of Search ................................. 242/312, 313, 242/314, 315

[56] References Cited

U.S. PATENT DOCUMENTS

| | | |
|---|---|---|
| 4,807,827 | 2/1989 | Welch . |
| 4,830,308 | 5/1989 | Puryear . |
| 5,120,002 | 6/1992 | Kawai ..................................... 242/314 |
| 5,370,331 | 12/1994 | Sato ....................................... 242/314 |
| 5,386,948 | 2/1995 | Sato ....................................... 242/314 |
| 5,429,318 | 7/1995 | Sato ....................................... 242/314 |
| 5,540,397 | 7/1996 | Yoshikawa ............................. 242/314 |
| 5,558,290 | 9/1996 | Sato ....................................... 242/314 |

Primary Examiner—Katherine Matecki
Attorney, Agent, or Firm—Wood, Phillips, VanSanten, Clark & Mortimer

[57] ABSTRACT

A fishing reel is provided having a frame with first and second laterally spaced parts between which a line storage space is defined, a spool upon which a supply of line can be wrapped, first structure cooperating between the spool and frame to allow the spool to be moved laterally through one of the first and second frame parts selectively between a) an operative position wherein the spool is supported for rotation about a first laterally extending axis and b) a separated position, a side cover assembly, and second structure cooperating between the side cover assembly and frame for mounting the side cover assembly to the frame for movement relative to the frame between a) a first position and b) a second position. The side cover assembly in a first position maintains the spool in an operative position and the second position allows the spool to be moved from the operative position to the separated position. Second cooperating structure mounts the side cover assembly to the frame for pivoting movement about a second axis between the first and second positions.

19 Claims, 4 Drawing Sheets

FIG. 2

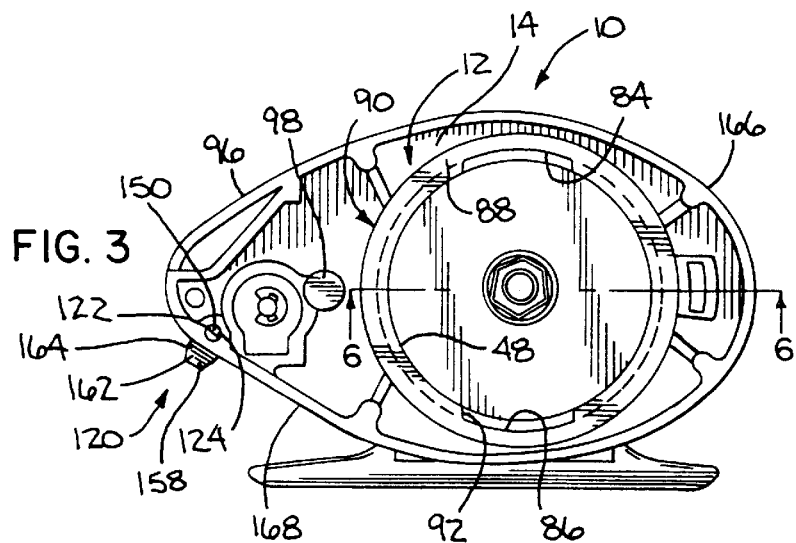
FIG. 3
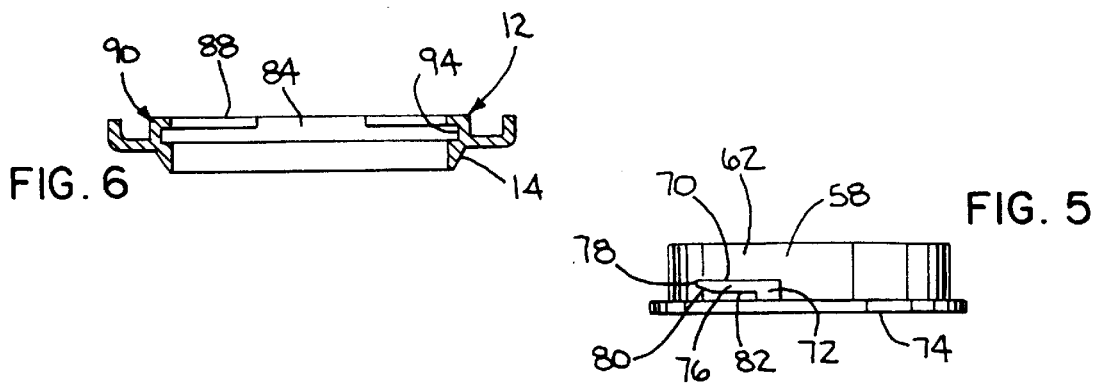
FIG. 6
FIG. 5
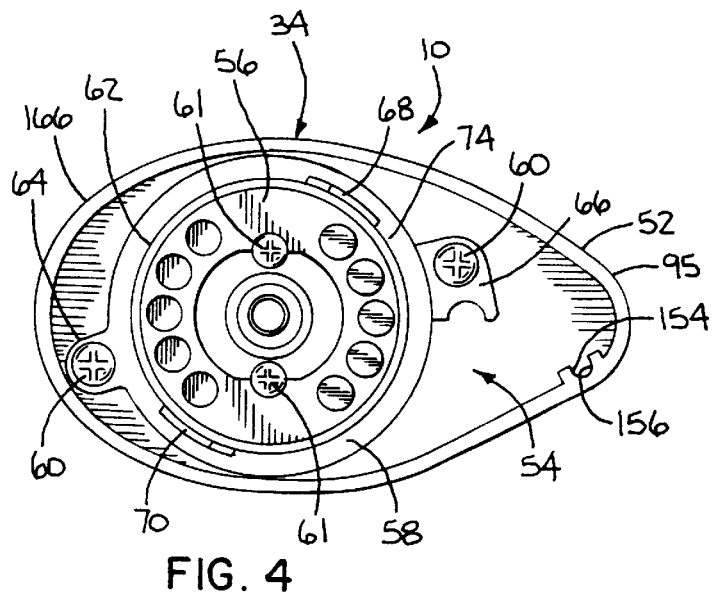
FIG. 4

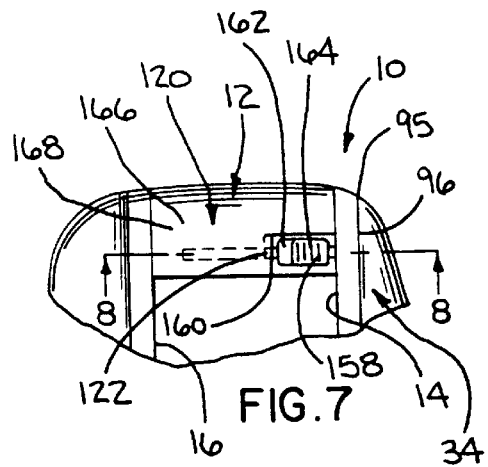
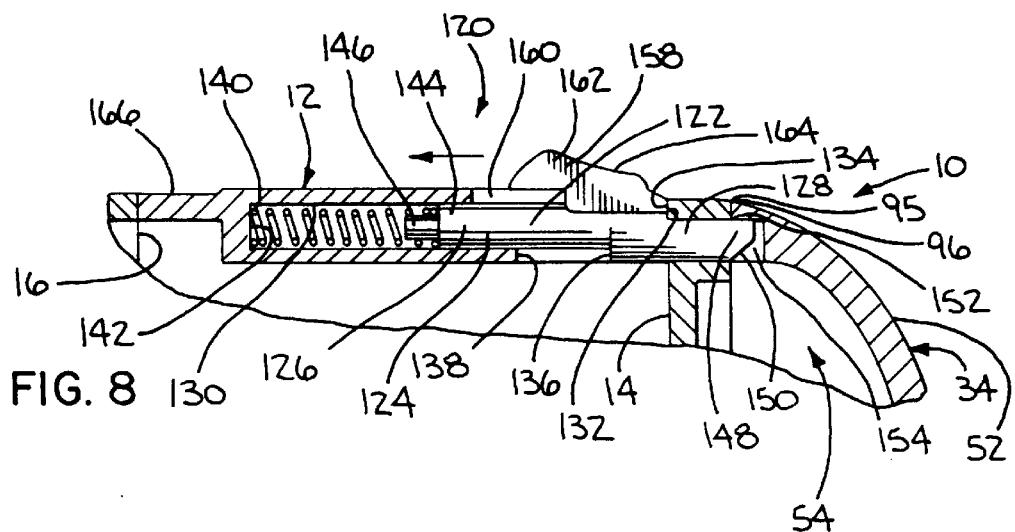
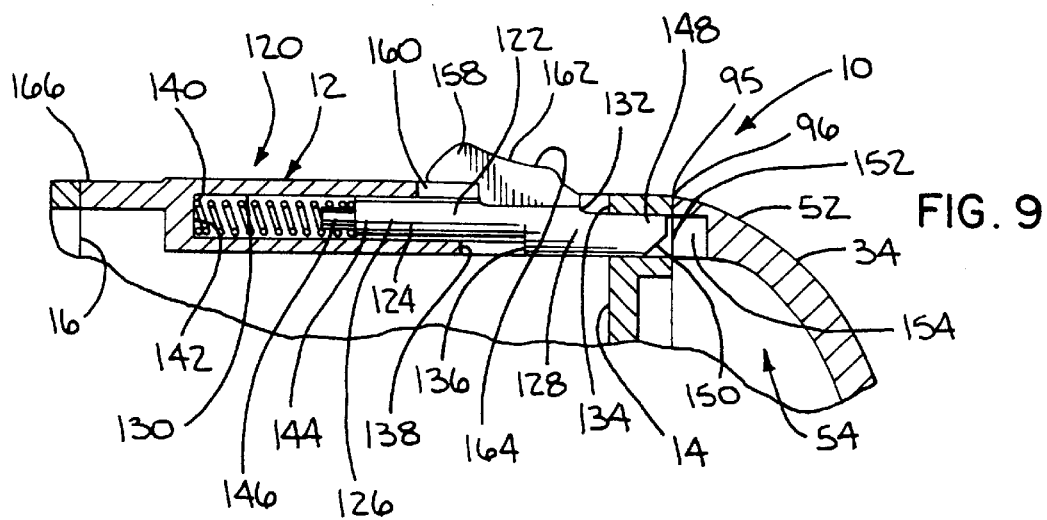

FISHING REEL WITH REMOVABLE SIDE COVER ASSEMBLY

BACKGROUND OF THE INVENTION

1. Field of the Invention

This invention relates to fishing reels of the type having a spool that is rotatable to retrieve line and, more particularly, to a fishing reel with a removable side cover assembly that facilitates assembly and removal of the line carrying spool.

2. Background Art

There are a multitude of different baitcast-type fishing reels offered on the market today. Typical of this construction is a spool which is rotatable to retrieve line onto the fishing reel. A crank handle imparts rotation to the spool through a drive train with the fishing reel in a retrieve mode. By operating an actuator, the user disengages the drive train to place the fishing reel in a cast mode. In the cast mode, the spool is "free-wheeling". By thrusting the bait in a normal casting motion, the weight of the bait causes the line to pay out and as a result the spool to initially rotate at a relatively high speed. The experienced user can controllably use his/her thumb to feather the rotating spool to prevent line tangling in the spool region. However, even the experienced user will inevitably create a condition wherein the line payout speed and rotational speed of the spool differ, as a result of which "backlashes" and "bird nests" are generated in the line supply.

At times this condition can be easily remedied by the user. However, the condition can become so severe that it is most convenient for the user to completely separate the spool from the remainder of the reel to access the tangled line.

In a common form of baitcast reel, the side cover assembly, on the side opposite to the crank handle, can be removed by releasing a series of long bolts which are directed laterally through the side cover assembly and into a frame supporting the reel operating mechanism and the side cover assembly. Aside from the inconvenience of having to loosen and eventually re-tighten a plurality of bolts, the user risks losing these bolts, particularly when the disassembly is carried out in a boat.

The same inconvenience is contended with at the point of manufacture. That is, the assembler, with the above described construction, is required to insert the spool through the reel frame and thereafter align the blocking side cover assembly, insert anchoring bolts, and tighten the anchoring bolts.

SUMMARY OF THE INVENTION

In one form of the invention, a fishing reel is provided having a frame with first and second laterally spaced parts between which a line storage space is defined, a spool upon which a supply of line can be wrapped, first structure cooperating between the spool and frame to allow the spool to be moved laterally through one of the first and second frame parts selectively between a) an operative position wherein the spool is supported for rotation relative to the frame about a first laterally extending axis and b) a separated position, a side cover assembly, and second structure cooperating between the side cover assembly and frame for mounting the side cover assembly to the frame for movement relative to the frame between a) a first position and b) a second position. The side cover assembly in the first position maintains the spool in the operative position and in the second position allows the spool to be moved from the operative position to the separated position. The second cooperating structure mounts the side cover assembly to the frame for pivoting movement about a second axis between the first and second positions.

In one form, the second axis is substantially coincident with the first axis.

The second cooperating structure may include at least one arm with a first laterally facing surface on one of the frame and side cover assembly and a second laterally facing surface on the other of the frame and side cover assembly, with the first and second laterally facing surfaces confronting each other to limit movement of the side cover assembly and frame laterally away from each other with the side cover assembly in the first position.

The first and second laterally facing surfaces may be configured to produce a camming action that draws the side cover assembly and frame laterally towards each other as an incident of the side cover assembly being moved from the second position towards the first position.

The arm may be L-shaped.

The second cooperating structure may include a third surface on the frame and a fourth surface on the side cover assembly, which surfaces are spaced further from the first axis than the arm is spaced from the first axis and abut to each other as the side cover assembly is moved from the second position into the first position to prevent movement of the side cover assembly from the second position to beyond the first position.

In one form, the third surface is defined by a post on the frame and the fourth surface is defined by a tab on the side cover assembly.

The tab may have a fifth surface that faces laterally, with the post having a sixth surface that faces laterally oppositely to the fifth surface. The fifth and sixth surfaces are in confronting relationship to limit movement of the frame and side cover assembly laterally away from each other with the side cover assembly in the first position.

The second cooperating structure may further include a latch assembly on one of the frame and side cover assembly that is repositionable selectively between a) a latched state and b) an unlatched state. The latch assembly in the latched state prevents pivoting of the side cover assembly from the first position into the second position and in the unlatched state allows the side cover assembly to pivot between the first and second positions.

In one form, the latch assembly cooperates with the other of the frame and side cover assembly to cause the latch assembly to assume its latched state as an incident of the side cover assembly being moved from the second position into the first position.

In one form, the latch assembly includes a bolt that is laterally translatable between a) an extended position with the latch assembly in the latched state and b) a retracted position with the latch assembly in the unlatched state.

The latch assembly may include a spring element for normally urging the bolt toward the extended position. 10 In one form, there is a surface on the other of the frame and side cover assembly that engages the bolt in the extended position as the side cover assembly moves from the second position towards the first position and urges the bolt towards the retracted position, with the bolt assuming the extended position as the side cover assembly realizes the first position.

An actuator can be provided on the latch assembly that is operable by a user to manually reposition the bolt from the extended position into the retracted position.

In one form, the fishing reel has a front and a rear, a top and bottom, and an external surface, with the actuator being exposed at the external surface of the fishing reel on a downwardly facing portion of the external surface at the front of the fishing reel.

In another form of the invention, a fishing reel is provided having a frame with first and second laterally spaced parts between which a line storage space is defined, a spool around which a supply of line can be wrapped, first structure cooperating between the spool and frame to allow the spool to be moved laterally through one of the first and second frame parts selectively between a) an operative position wherein the spool is supported for rotation about a first laterally extending axis and b) a separated position wherein the spool is fully separated from the frame, a side cover assembly, and second structure cooperating between the side cover assembly and frame for mounting the side cover assembly to the frame for movement relative to the frame between a) a first position and b) a second position, with the side cover assembly in the first position maintaining the spool in the operative position and in the second position allowing the spool to be moved from the operative position to the separated position. The second cooperating structure can be constructed to maintain the side cover assembly in the first position as an incident of the side cover assembly being moved from the second position into the first position.

The second cooperating structure may include a latch assembly on one of the frame and side cover assembly, with the latch assembly including a bolt that is repositionable between two different positions corresponding to latched and unlatched states for the latch assembly. A spring element normally urges the bolt to one of the two positions. A surface on the frame and side cover assembly engages the bolt in the one of the two positions and urges the bolt toward the other of the two positions as the side cover assembly is moved from the second position into the first position. The bolt reassumes the one of the two positions upon the side cover assembly realizing the first position and abuts to the other of the frame and side cover assembly to prevent movement of the side cover assembly from the first position into the second position.

In one form, the fishing reel has an external surface and there is an actuator exposed at the external surface that is operable by a user to manually move the bolt from the one of the two positions into the other of the two positions with the side cover assembly in the first position to thereby allow the side cover assembly to be moved from the first position into the second position.

The second cooperating structure may include first and second laterally facing surfaces, one each on the frame and side cover assembly, that cooperate and draw the frame and side cover assembly laterally towards each other as an incident of the side cover assembly being moved from the second position into the first position.

The second cooperating structure may further include third and fourth surfaces, one each on the frame and side cover assembly, that abut as the side cover assembly is moved from the second position into the first position to prevent movement of the side cover assembly from the second position to beyond the first position. The third and fourth surfaces may be spaced further from the first axis than the first and second surfaces are spaced from the first axis.

BRIEF DESCRIPTION OF THE DRAWINGS

FIG. 3 is an enlarged, side elevation view of the fishing reel in FIGS. 1 and 2 with the side cover assembly removed;

FIG. 4 is an enlarged, side elevation view of the side cover assembly;

FIG. 5 is an enlarged, fragmentary, bottom view of a part on the side cover assembly used to mount the side cover assembly on the fishing reel;

FIG. 6 is an enlarged, cross-sectional view of a portion of a frame on the fishing reel that cooperates with the side cover assembly part of FIG. 5 and taken along line 6—6 of FIG. 3;

FIG. 7 is an enlarged, fragmentary, bottom view of the front portion of the fishing reel in FIG. 1 and showing a latch assembly for maintaining the side cover assembly on the fishing reel;

FIG. 8 is an enlarged, fragmentary, cross-sectional view of the latch assembly taken along line 8—8 of FIG. 8 and with the latch assembly in a latched state;

FIG. 9 is a view as in FIG. 8 with the latch assembly in an unlatched state;

DETAILED DESCRIPTION OF THE DRAWINGS

Figure 1:
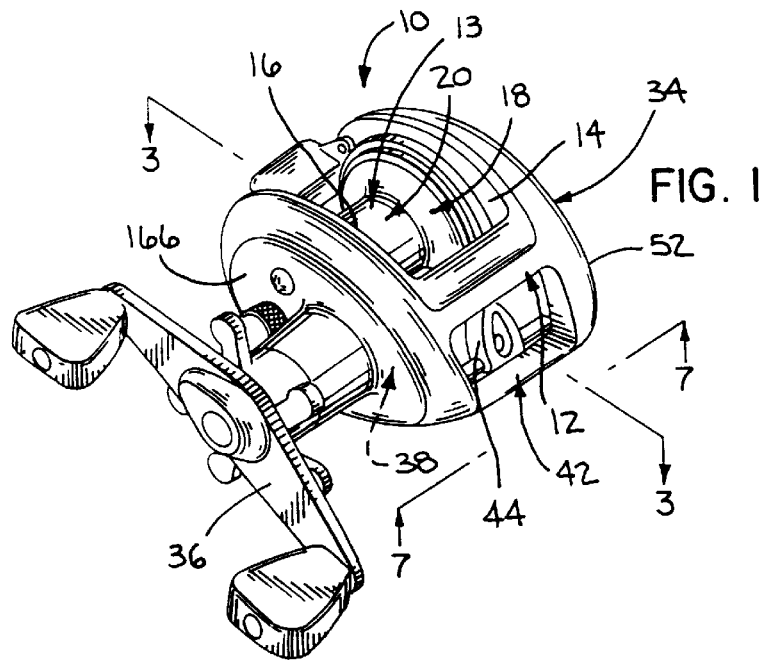
FIG. 1 is a front perspective view of a baitcast fishing reel having a removable side cover assembly, according to the present invention.
Figure 2:
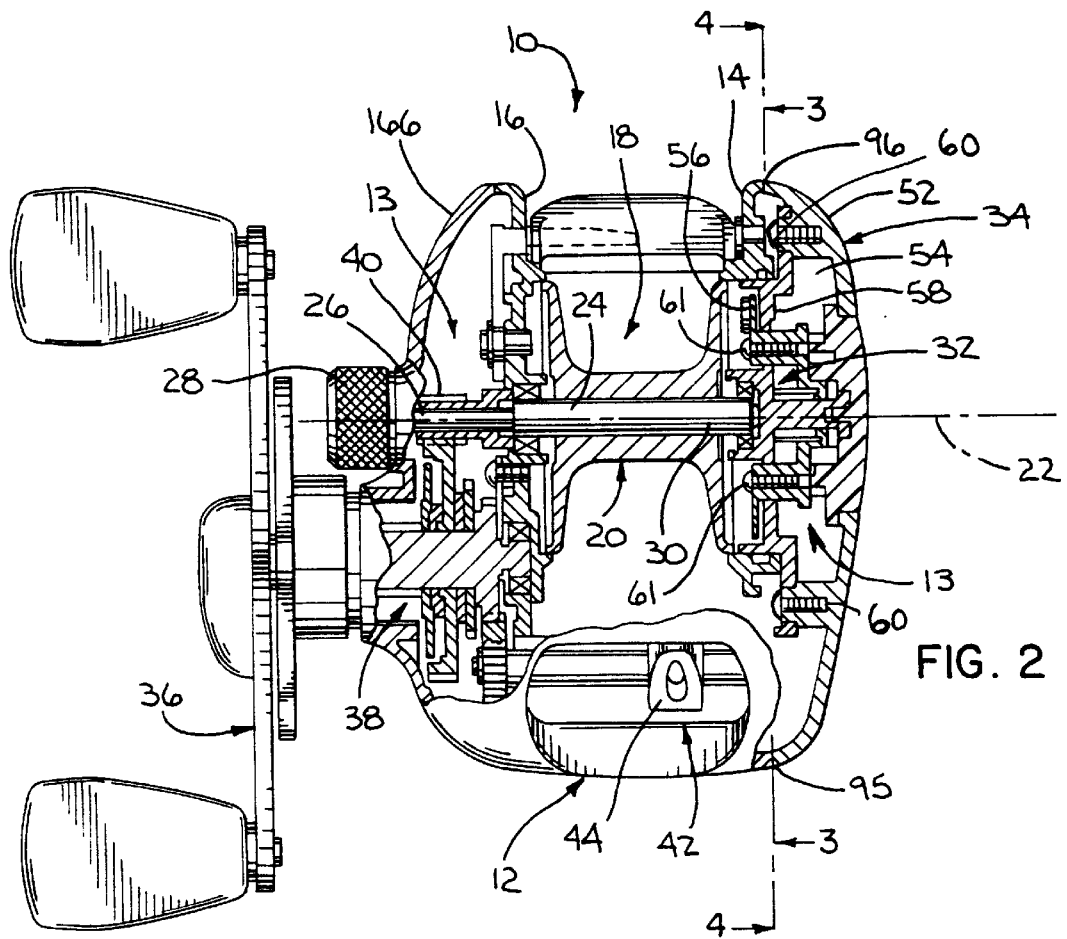
FIG. 2 is an enlarged, cross sectional view of the fishing reel taken along line 2—2 of FIG. 1.
Figure 10:
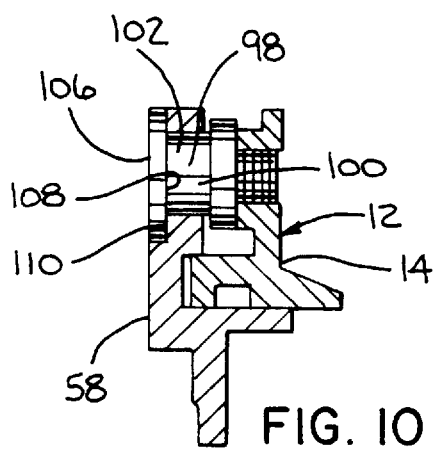
FIG. 10 is an enlarged, fragmentary, cross-sectional view of another connection between the side cover assembly part of FIG. 5 and the reel frame to limit movement between the side cover assembly and frame.

A baitcast fishing reel, of the type into which the present invention can be incorporated, is shown in the drawings at 10. The fishing reel 10 has a frame 12 that supports a reel operating mechanism 13. The frame 12 includes laterally spaced frame parts 14, 16 between which a line storage space 18 is defined. A spool 20 has laterally opposite ends supported on the frame parts 14, 16 in such a manner that the spool 20 spans the line storage space 18 and is rotatable about a laterally extending axis 22. The spool 20 has a central shaft 24 with one end 26 journalled for rotation in a bearing assembly 28 on the frame part 16 and an opposite end 30 journalled for rotation on a bearing assembly 32 on a removable side cover assembly 34 on the frame part 14. Rotation of the spool 20 is imparted through a crank handle 36. The torque from the crank handle 36 is transmitted through a drive train 38 to a gear 40 on the shaft end 26.

The crank handle 36, through the drive train 38, also operates a level wind guide mechanism 42 at the front of the fishing reel 10. The level wind guide mechanism 42 includes a guide element 44 through which line from the spool 20 extends. The guide element 44 is moved laterally in an oscillatory pattern to cause an even distribution of line upon the spool 20 as the spool 20 is rotated.

The details of the drive train 38 and level wind guide mechanism 42 are peripheral to the present invention. In fact, the basic operating mechanism for the entire fishing reel 10 is well known in the art. An exemplary operating mechanism is shown and described in detail in U.S. Pat. No. 4,807,827, incorporated herein by reference.

Figure 11:
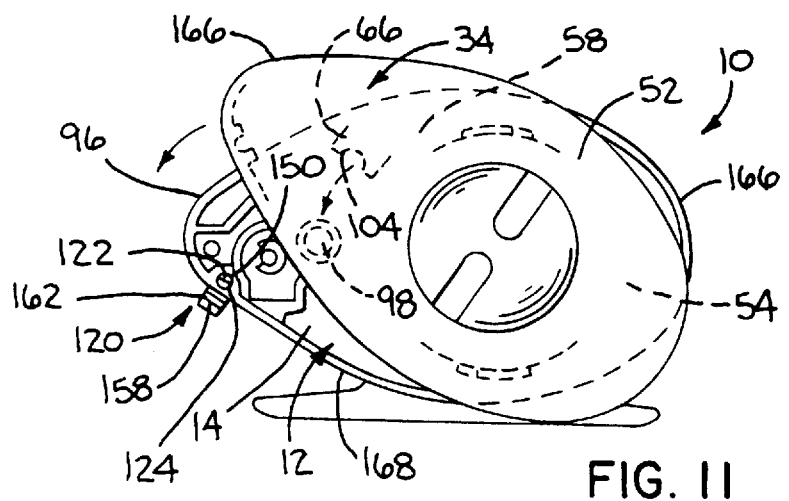
FIG. 11 is an enlarged, side elevation view of the fishing reel with the side cover being repositioned to be maintained on the fishing reel.

The present invention is directed to the connection between the side cover assembly 34, which supports the spool shaft end 30, and the frame 12. According to the invention, the side cover assembly 34 is repositionable relative to the frame 12 between a first, assembled position, as shown in FIGS. 1, 2, and 7–9, and a second position, as shown in FIG. 11, wherein the side cover assembly 34 is separable from the frame 12. With the side cover assembly 34 in the second position and separated from the frame 12, the spool 20 and associated shaft 24 can be translated laterally through an opening 48 in the frame part 14 to the operative position of FIG. 2, wherein the gear 40 on the spool shaft end 26 is in mesh with the drive train 38. With the side cover assembly 34 in the first position, the side cover assembly 34 blocks the spool 22 in the operative position.

The side cover assembly 34 has a cup-shaped wall 52 defining a receptacle 54 for the bearing assembly 32, with an associated magnetic brake ring 56, and an annular mount part 58. The mount part 58 is fixedly secured to the wall 52 through screws 60 in such a manner that it captively holds the bearing assembly 32 in a properly aligned, operative position. The brake ring 56 is in turn secured to the bearing assembly 32 through screws 61. The basic function of the bearing assembly 32 and brake ring 56 are well known in the art and thus a detailed description thereof is unnecessary. One exemplary brake ring is described in U.S. Pat. No. 4,830,308, incorporated herein by reference.

The mount part 58 has an annular body 62 with radially oppositely projecting tabs 64, 66. The screws 60 are directed, one each through the tabs 64, 66 into the wall 52.

The mount part 58 has diametrically opposite, L-shaped arms 68, 70, which are structurally and functionally the same. On the exemplary arm 70, a shorter leg 72 projects laterally away from a radially enlarged flange 74 on the mount part 58, with there being a longer leg 76 extending away from the shorter leg 72 through several degrees around the circumference of the body 62 of the mount part 58. The free end 78 of the leg 76 has a ramped surface 80 which blends into a flat, laterally facing surface 82.

The arms 68, 70 are designed to be received, one each in a pair of diametrically opposite slots 84, 86 through a rim 88 on a thickened portion 90 of the frame part 14. The arms 68, 70 are located on the side cover assembly 34 so that the arms 68, 70 are introduced to the slots 84, 86 with the side cover assembly 34 in the second position shown in FIG. 11. The side cover assembly 34 is then moved into the first position by pivoting the side cover assembly 34 in a counterclockwise direction in FIG. 3 about the axis 22 relative to the frame 12. As this occurs, the ramp surface 80 on the leg 76 abuts to an edge 92 on the rim 88 bounding the slot 86. As a continued counterclockwise pivoting force is applied to the side cover assembly 34, the surface 80 and edge 92 cooperate to cam the side cover assembly 34 and frame 12 laterally towards each other until the arms 68, 70 laterally coincide with a radial undercut 94 laterally inside the rim 88. Continued pivoting of the side cover assembly 34 to its first position causes the thickness of the rim 88 to be firmly captively held between the surface 82 of the leg 76 and the flange 74. The arm 68 cooperates with the rim 88 in like fashion. With this arrangement, the side cover assembly 34 and frame 12 are firmly held against relative movement laterally away from each other.

The peripheral corner 95 of the wall 52 has a matching shape with the mating corner 96 of the frame 12 to create a smooth transition between the wall 52 and frame 12 with the side cover assembly 34 in the first position. To limit pivoting of the side cover assembly 34 in the counterclockwise direction in FIG. 3 so that the side cover assembly 34 is precisely in the first position, a stopping post 98 is provided on the frame 12. The post 98 has a cylindrical body 100 with a curved circumferential surface 102 which abuts to a correspondingly shaped, curved surface 104 on the tab 66 as the side cover assembly 34 realizes its first position. Aside from maintaining the desired pivoted alignment between the side cover assembly 34 and the frame 12, the post 98 prohibits the side cover assembly 34 from pivoting to the point that as a consequence the arms 68, 70 might be severed by the rim 88.

The post 98 has an enlarged head 106 defining a radially inwardly facing, annular surface 108, which confronts a laterally outwardly facing surface 110 on the tab 66, thereby acting as an additional means to prevent movement of the side cover assembly 34 and frame 12 laterally away from each other with the side cover assembly 34 in the first position.

To prevent inadvertent clockwise pivoting of the side cover assembly 34, as viewed from the FIG. 11 perspective, as might result in release of the side cover assembly 34 from the frame 12, a latch assembly is provided, as shown in FIGS. 3 and 8–10. The latch assembly 120 includes an elongate bolt 122 having a body 124 defined by radially offset sections 126, 128. The bolt 122 is guidingly movable within a receptacle 130 defined on the frame 12 between an extended position, as shown in FIG. 9 wherein the latch assembly 120 is in a latched state, and a retracted position, shown in FIG. 10, wherein the latch assembly 120 is in an unlatched state. The bolt 122 is limited in movement beyond the extended position of FIG. 8 by a shoulder 132 which is abuttable to a shoulder 134 on the frame 12. An oppositely facing shoulder 136 on the bolt 122 abuts to a shoulder 138 on the frame 12 to limit movement of the bolt 122 in a retracting direction.

A coil spring 140 is compressed between a wall surface 142 bounding the receptacle 130 and a laterally inward end 144 of the bolt 122. The spring 140 surrounds a reduced diameter post 146 formed on the free end 144 of the bolt 122. With this arrangement, the bolt 122 is normally urged towards its extended position.

The bolt end 148, opposite to the end 144, has a cam surface 150 thereon. With the bolt 122 in its extended position and the bolt shoulder 132 abutted to the frame shoulder 134, the cam surface 150 resides in the path of an edge surface 152 on the side cover assembly 34 at the corner 95, as the side cover assembly 34 is pivoted from the FIG. 3 position in a counterclockwise direction toward its first position. As this occurs, the edge surface 152 progressively cams the bolt 122 towards its retracted position, whereupon the edge surface 152 eventually passes over the bolt free end 148. Upon the side cover assembly 34 realizing its first position, the bolt 122 aligns with a receptacle 154 on the side cover assembly 34. The bolt 122 is allowed to extend into the receptacle 154 under the action of the coil spring 140, as a consequence of which the bolt 122 prohibits the side cover assembly 34 from pivoting in a clockwise direction, from the FIG. 3 perspective, from its first position back to its second position. Pivoting of the side cover assembly 34 in one direction is prohibited by the cooperating surfaces 102, 104 and in the opposite direction is prohibited by the bolt 122 and a surface 156 bounding the receptacle 154.

To release the side cover assembly 34, the bolt 122 must be retracted.

This is accomplished manually through an actuator 158 on the bolt 122 that is movable within a slot 160 guidingly in such a fashion as to allow the bolt 122 to be retracted to the FIG. 9 position, i.e. out of the path of the side cover assembly 34, whereupon the side cover assembly 34 can be pivoted to the second position to allow removal of the spool 20.

The actuator 158 has an enlarged head 162 with a knurled surface 164 that facilitates sliding movement. The head 162 is exposed at the external surface 166 of the fishing reel 10 and is preferably located at an underside portion 168 of the external surface 166 at the forward portion of the reel 10.

With the above described arrangement, and the side cover assembly 34 separated from the frame 12, the user/manufacturer can assemble the spool 20, align the side cover assembly with the frame 12, advance the side cover assembly 34 laterally against the frame 12, and with a simple pivoting action, cause the side cover assembly 34 to assume and be maintained in its first position on the frame 12. Release thereof can be effected simply by repositioning the latch bolt 122, whereupon the assembly steps can be reversed.

The foregoing disclosure of specific embodiments is intended to be illustrative of the broad concepts comprehended by the invention.

I claim:

1. A fishing reel comprising:
   a frame having first and second laterally spaced parts between which a line storage space is defined;
   a spool around which a supply of line can be wrapped,
   first means cooperating between the spool and frame to allow the spool to be moved laterally through one of the first and second frame parts selectively between a) an operative position wherein the spool is supported for rotation relative to the frame about a first laterally extending axis and b) a separated position;
   a side cover assembly; and
   second means cooperating between the side cover assembly and frame for mounting the side cover assembly to the frame for movement relative to the frame between a) a first position and b) a second position,
   said side cover assembly in the first position maintaining the spool in the operative position and in the second position allowing the spool to be moved from the operative position to the separated position,
   said second cooperating means comprising means for mounting the side cover assembly to the frame for pivoting movement about a second axis between the first and second positions,
   said second cooperating means comprising a first stop surface on the frame and a second stop surface on the side cover assembly, the first and second stop surfaces being spaced from the first axis, said first and second stop surfaces abutting to each other as the side cover assembly is moved from the second position into the first position to prevent movement of the side cover assembly from the second position to beyond the first position.

2. The fishing reel according to claim 1 wherein the second axis is substantially coincident with the first axis.

3. The fishing reel according to claim 1 wherein the second cooperating means comprises a) at least one arm with a first laterally facing surface on one of the frame and side cover assembly and b) a second laterally facing surface on the other of the frame and side cover assembly, said first and second laterally facing surfaces confronting each other to limit movement of the side cover assembly and frame laterally away from each other with the side cover assembly in the first position.

4. The fishing reel according to claim 3 wherein the first and second laterally facing surfaces are configured to produce a camming action that draws the side cover assembly and the frame laterally towards each other as an incident of the side cover assembly being moved from the second position towards the first position.

5. The fishing reel according to claim 4 wherein the arm is L-shaped.

6. The fishing reel according to claim 1 wherein the first stop surface is defined by a post on the frame and the second stop surface is defined by a tab on the side cover assembly.

7. The fishing reel according to claim 6 wherein the tab has a tab surface that faces laterally and the post has a post surface that faces laterally oppositely to the tab surface, said tab and post surfaces being in confronting relationship to limit movement of the frame and side cover assembly laterally away from each other with the side cover assembly in the first position.

8. The fishing reel according to claim 1 wherein the second cooperating means further comprises a latch on one of the frame and side cover assembly that is repositionable selectively between a) a latched state and b) an unlatched state, said latch assembly in the latched state preventing pivoting of the side cover assembly from the first position into the second position and in the unlatched state allowing the side cover assembly to pivot between the first and second positions.

9. The fishing reel according to claim 8 wherein the second cooperating means includes means cooperating between the latch assembly and the other of the frame and side cover assembly for causing the latch assembly to assume its latched state as an incident of the side cover assembly being moved from the second position into the first position.

10. The fishing reel according to claim 8 wherein the latch assembly comprises a bolt that is laterally translatable between a) an extended position with the latch assembly in the latched state and b) a retracted position with the latch assembly in the unlatched state.

11. The fishing reel according to claim 10 wherein the latch assembly comprises a spring element for normally urging the bolt toward the extended position and there is a surface on the other of the frame and side cover assembly that engages the bolt in the extended position as the side cover assembly moves from the second position towards the first position and urges the bolt towards the retracted position, said bolt assuming the extended position as the side cover assembly realizes the first position.

12. The fishing reel according to claim 11 wherein there is an actuator knob on the latch assembly that is operable by a user to manually reposition the bolt from the extended position into the retracted position.

13. The fishing reel according to claim 12 wherein the fishing reel has a front and rear, a top and bottom and an external surface and the actuator is exposed at the external surface of the fishing reel on a downwardly facing portion of the external surface at the front of the fishing reel.

14. A fishing reel comprising:
   a frame having first and second laterally spaced parts between which a line storage space is defined;
   a spool around which a supply of line can be wrapped,
   first means cooperating between the spool and frame to allow the spool to be moved laterally through one of the first and second frame parts selectively between a) an operative position wherein the spool is supported for rotation relative to the frame about a first laterally extending axis and b) a separated position wherein the spool is fully separated from the frame;
   a side cover assembly; and
   second means cooperating between the side cover assembly and frame for mounting the side cover assembly to the frame for movement relative to the frame between a) a first position and b) a second position, said side cover assembly in the first position maintaining the spool in the operative position and in the second position allowing the spool to be moved from the operative position to the separated position, said second cooperating means for maintaining the side cover assembly in the first position as an incident of the side cover assembly being moved from the second position into the first position, said second cooperating means further comprising a latch on one of the frame and the side cover assembly that is selectively repositionable along a second laterally extending axis between a) a latched state and b) an unlatched state said latch in the latched state preventing movement of the side cover assembly from the first position into the second position and in the unlatched state allowing the side cover assembly to move between the first and second positions.

15. The fishing reel according to claim 14 wherein said latch comprises a bolt that is repositionable between two different positions corresponding to latched and unlatched states for the latch, said latch further comprising a spring element for normally urging the bolt to one of the two positions, said second cooperating means further comprising a surface on the other of the frame and side cover assembly that engages the bolt in the one of the two positions and urges the bolt toward the other of the two positions as the side cover assembly is moved from the second position into the first position, the bolt reassuming the one of the two positions upon the side cover assembly realizing the first position and abutting to the other of the frame and side cover assembly to prevent movement of the side cover assembly from the first position into the second position.

16. The fishing reel according to claim 15 wherein the fishing reel has an external surface, there is an actuator exposed at the external surface that is operable by a user to manually move the bolt from the one of the two positions into the other of the two positions with the side cover assembly in the first position to thereby allow the side cover assembly to be moved from the first position into the second position.

17. The fishing reel according to claim 16 wherein the side cover assembly is pivotable about an axis between the first and second positions.

18. The fishing reel according to claim 17 wherein the second cooperating means comprises cooperating first and second laterally facing surfaces, one each on the frame and side cover assembly, that draw the frame and side cover assembly laterally towards each other as an incident of the side cover assembly being moved from the second position into the first position.

19. The fishing reel according to claim 18 wherein the second cooperating means comprises cooperating third and fourth surfaces, one each on the frame and side cover assembly, that abut as the side cover assembly is moved from the second position into the first position to prevent movement of the side cover assembly from the second position to beyond the first position, said third and fourth surfaces being spaced further from the first axis than the first and second surfaces are spaced from the first axis.

* * * * *